(12) United States Patent
Chand et al.

(10) Patent No.: US 7,210,330 B2
(45) Date of Patent: May 1, 2007

(54) METHODS OF FABRICATING STRUCTURES FOR CHARACTERIZING TIP SHAPE OF SCANNING PROBE MICROSCOPE PROBES AND STRUCTURES FABRICATED THEREBY

(75) Inventors: Ami Chand, Goleta, CA (US); Nihat Okulan, Santa Barbara, CA (US)

(73) Assignee: Veeco Instruments, Inc., Woodbury, NY (US)

( * ) Notice: Subject to any disclaimer, the term of this patent is extended or adjusted under 35 U.S.C. 154(b) by 0 days.

(21) Appl. No.: 11/466,908

(22) Filed: Aug. 24, 2006

(65) Prior Publication Data

US 2006/0277972 A1 Dec. 14, 2006

Related U.S. Application Data

(62) Division of application No. 10/844,200, filed on May 12, 2004, now Pat. No. 7,096,711.

(51) Int. Cl.
*G01B 21/30* (2006.01)
(52) U.S. Cl. ........................................... 73/1.89
(58) Field of Classification Search ................. 73/1.89
See application file for complete search history.

(56) References Cited

U.S. PATENT DOCUMENTS

| | | | |
|---|---|---|---|
| 5,186,041 A | 2/1993 | Nyyssonen | |
| 5,242,541 A | 9/1993 | Bayer et al. | |
| 5,345,816 A | 9/1994 | Clabes et al. | |
| 5,382,795 A | 1/1995 | Bayer et al. | |
| 5,534,359 A | 7/1996 | Bartha et al. | |
| 5,578,745 A | 11/1996 | Bayer et al. | |
| 5,599,464 A | 2/1997 | Laird et al. | |
| 5,665,905 A | 9/1997 | Bartha et al. | |
| 5,960,255 A | 9/1999 | Bartha et al. | |
| 6,016,684 A | 1/2000 | Scheer et al. | |
| 6,028,008 A | 2/2000 | Bayer et al. | |
| 6,066,265 A | 5/2000 | Galvin et al. | |
| 6,091,124 A | 7/2000 | Bayer et al. | |
| 6,169,281 B1 | 1/2001 | Chen et al. | |
| 6,218,264 B1 | 4/2001 | Bartha et al. | |
| 6,250,143 B1 | 6/2001 | Bindell et al. | |
| 6,354,133 B1 | 3/2002 | Yedur et al. | |
| 6,489,611 B1 | 12/2002 | Aumond et al. | |
| 6,504,152 B2 | 1/2003 | Hantschel et al. | |
| 6,545,273 B1 | 4/2003 | Singh et al. | |
| 6,591,658 B1 | 7/2003 | Yedur et al. | |

(Continued)

*Primary Examiner*—Hezron Williams
*Assistant Examiner*—John Fitzgerald
(74) *Attorney, Agent, or Firm*—Wood, Herron & Evans LLP (57) ABSTRACT

A characterizer for determining the shape of a probe tip for an atomic force microscope and methods of fabricating and using the characterizer. The characterizer includes a micromachined crystalline structure with opposed edges separated by a width suitable for characterizing a dimension of the probe tip. At least one of the opposed edges overhangs an undercut region of the micromachined crystalline structure by an overhang distance that is greater than one third of the width. The probe tip is scanned across the edges of the characterizer for shape determination. The characterizer is formed by serially deep reactive ion etching and anisotropic etching (100) single crystal silicon. The opposed edges may be oxidation sharpened for use in profiling an end or side of the probe tip.

10 Claims, 3 Drawing Sheets

U.S. PATENT DOCUMENTS 6,810,354 B1 10/2004 Dahlen
2004/0134265 A1* 7/2004 Mancevski .................. 73/105
2005/0194534 A1* 9/2005 Kneedler et al. ........... 250/307
2005/0252282 A1* 11/2005 Chand et al. ................. 73/105

* cited by examiner

METHODS OF FABRICATING STRUCTURES FOR CHARACTERIZING TIP SHAPE OF SCANNING PROBE MICROSCOPE PROBES AND STRUCTURES FABRICATED THEREBY

CROSS-REFERENCE TO RELATED APPLICATIONS

This application is a divisional of application Ser. No. 10/844,200, filed May 12, 2004, now U.S. Pat. No. 7,096,711 B2 the disclosure of which is hereby incorporated by reference herein in its entirety.

FIELD OF THE INVENTION

The invention relates to probe microscopy and, more particularly, to methods of fabricating structures for characterizing the tip shape of probes used in a scanning probe microscope and structures formed by such methods.

BACKGROUND OF THE INVENTION

Atomic force microscopes (AFM's) were developed, among other reasons, to meet a demand for accurately measuring critical dimensions (CDs) during integrated circuit (IC) fabrication. Critical dimensions constitute the width of a line or space, such as the width of a patterned line, the distance between two lines or devices, or the size of a contact, on a substrate identified as crucial for proper operation of the device being fabricated. Critical dimensions are measured on some or all substrates following any photolithography or etching process in which the dimensions are critical. Due to their high spatial resolution, AFM's are well suited for measuring critical dimensions during IC fabrication.

Generally, AFM's are equipped to sense atoms on or in sample surfaces, thereby providing atomic level surface imaging. AFM images are reconstructed from digital data acquired during grid scanning of a probe tip across the sample. Any AFM image represents the sample surface convoluted with the shape of the probe tip used to acquire the digital data. Moreover, the shape of the probe tip may change during scanning due to wear or the probe tip may become contaminated by foreign debris, thus introducing additional distortions into the image data. Measurement accuracy is improved if the distorted image data is corrected using a correction factor developed from the dimensions of the probe tip. The correction effectively deconvolves the shape of the probe tip from the digital data so that the AFM image accurately reflects the actual structure of the sample surface.

The shape of the probe tip may be determined by making physical measurements of the tip using a scanning electron microscope or deduced by reliance upon a known calibration standard or characterizer. As the dimensions of probe tips shrink for imaging shrinking IC features, the feature sizes approach the microscope resolution limit. For example, ten to thirty nanometer probe tips demand a resolution of one to two nanometers for accurate shape characterization. As a result, small probe tips are impossible to directly image with sufficient accuracy to provide correction factors for AFM image data. Hence, characterizers are required for deducing the shape of small probe tips, as disclosed in U.S. Pat. No. 6,810,354.

One class of conventional characterizers is structured as multiple trapezoidal pillars projecting from a surface with a spacing between adjacent pillars of approximately a few microns. A free end of each pillar is surrounded by an edge in the form of a thin outwardly-projecting lip that overhangs a trench separating adjacent pillars. As a result, the entrance to each trench is characterized by a pair of opposed edges. Each edge overhangs the trench by an overhang distance that is considerably less than one-third of the width between adjacent edges.

Such conventional characterizers are plagued by numerous deficiencies. One problem is that the pillar must be narrow to provide the best resolution for tip width measurements (which are made by scanning the probe tip over the pillar) and, concurrently, the overhang distance of the edge should be wider than the boot width of the probe tip. Satisfying both requirements would require an extremely thin pillar susceptible to fracture when struck by the probe tip during characterization. Another problem is observed when the probe tip and the characterizer pillar are aligned with a nonparallel relationship. This problem arises if, for example, the characterizer is mismounted in the AFM, the probe tip is mismounted in the AFM cantilever holder, or the characterizer pillars fail to meet specification and results in an inability to accurately characterize the boot shape. Specifically, in these situations, the probe tip may contact the sidewall of the pillar rather than the edge, which prevents accurate measurement of the boot shape on one side of the probe tip.

Yet another problem with conventional characterizers may occur if the AFM has a clamping function that prevents profiling below a given depth of a sample, typically a depth exceeding the length of the probe tip. The clamping function prevents false readings that may result from contact between the post of the probe tip and trench sidewalls, which is misinterpreted to be the probe tip contacting the base of a trench. The clamping function may interfere with the calibration process using conventional characterizers.

Conventional characterizers are limited in the extent to which the shape of a probe tip may be characterized. Conventional characterizers lack the ability to accurately characterize concavity on the bottom surface of the boot if the probe tip width is equal to, or less than, the width of the edges. Another limitation observed with conventional characterizers is that most only include parallel structures, which means that shape measurements may only be made in one direction as the probe tip is translated across the characterizer. As a result, the characterizer must be reoriented for characterizing additional portions of the probe tip, which cannot be dismounted from the AFM during characterization.

What is needed, therefore, is a characterizer for accurately determining the shape of an AFM probe tip that overcomes these and other deficiencies of conventional characterizers.

SUMMARY OF THE INVENTION

In accordance with an embodiment of the invention, an AFM probe tip characterizer includes a micromachined crystalline structure having opposed first and second edges separated by a width suitable for characterizing a dimension of an atomic force probe. At least one of the first and second edges overhangs an undercut region of the micromachined crystalline structure by an overhang distance that exceeds one third of the width.

In accordance with another embodiment of the invention, an AFM probe tip characterizer includes a micromachined crystalline structure having a substantially planar surface and a cavity defined below the surface. The cavity intersects the surface at opposed first and second spaced-apart edges elevated above the surface away from the cavity.

In accordance with yet another embodiment of the invention, an AFM probe tip characterizer includes a micromachined crystalline structure with a generally-planar surface and a cavity defined below the surface. The cavity intersects the surface at opposed first and second spaced-apart edges. At least one of the first and second edges overhangs a region of the cavity by an overhang distance that is greater than one third of a width between the first and second edges.

In accordance with another aspect of the invention, a method is provided for characterizing a probe tip of an atomic force microscope. The method includes providing a characterizer comprising a micromachined crystalline structure with a substantially planar surface and a cavity defined below the substantially planar surface in which the cavity intersects the surface at opposed first and second spaced-apart edges elevated above the surface away from the cavity. A bottom surface of the probe tip is positioned generally opposed to the substantially planar surface. A portion of the probe tip is profiled by moving the probe tip along the surface and over either the first edge or the second edge.

In accordance with another aspect of the invention, a method of forming a characterizer includes defining a cavity in a surface of a single crystal silicon substrate. The cavity includes opposed sidewalls and opposed edges at the intersection between the surface and the opposed sidewalls. The method further comprises anisotropically etching the opposed sidewalls so that the opposed edges are undercut by an overhang distance that is greater than one third of a width between the first and second edges.

These and other objects and advantages of the present invention shall become more apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Although the invention will be described next in connection with certain embodiments, the invention is not limited to practice in any one specific type of atomic force microscope (AFM). Exemplary AFM's in which the principles of the invention can be practiced are commercially available, for example, from Veeco Metrology Group (Santa Barbara, Calif.). The description of the invention is intended to cover all alternatives, modifications, and equivalent arrangements as may be included within the spirit and scope of the invention as defined by the appended claims.

Figure 1:
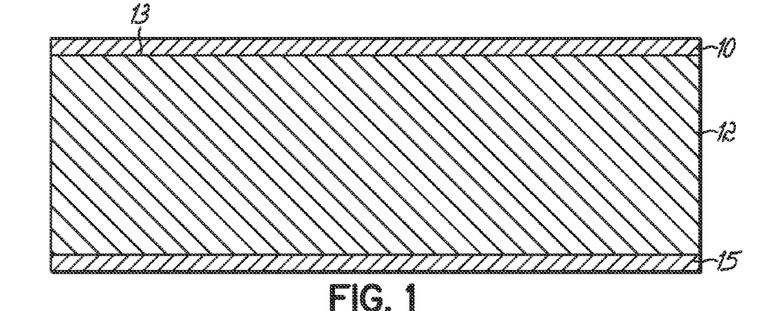
FIGS. 1–7 are cross-sectional views of a portion of a probe tip characterizer at various stages of an embodiment of a processing method in accordance with principles of the invention.

With reference to FIG. 1, a hard mask 10 is formed as a uniformly thick surface layer on a single crystal substrate 12, which is characterized by a substantially planar upper surface 13. A layer 15 of the hard mask material may also be formed on a backside of the substrate 12. In a specific embodiment of the invention, substrate 12 is a (100) silicon wafer characterized by a resistivity of one-tenth (0.1) ohm-cm to ten (10) ohm-cm, a thickness of about 200 µm to 500 µm, and a diameter of about four (4) inches, and the hard mask 10 is formed by a wet oxidation process, which may be performed, for example, at 950° C. for about forty-five (45) minutes to grow approximately 200 nanometers of oxide. The invention contemplates that the oxide hard mask 10 may be grown by any suitable technique, such as wet oxidation, dry oxidation, or a combination of these oxidation processes, or may be deposited by a conventional method.

References herein to terms such as "vertical", "horizontal", etc. are made by way of example, and not by way of limitation, to establish a frame of reference. The term "horizontal" as used herein is defined as a plane parallel to the conventional plane or surface of substrate 12, regardless of orientation. The term "vertical" refers to a direction perpendicular to the horizontal, as just defined. Terms, such as "on", "above", "below", "side" (as in "sidewall"), "higher", "lower", "over", "beneath" and "under", are defined with respect to the horizontal plane. It is understood that various other frames of reference may be employed without departing from the spirit and scope of the invention.

Figure 2:
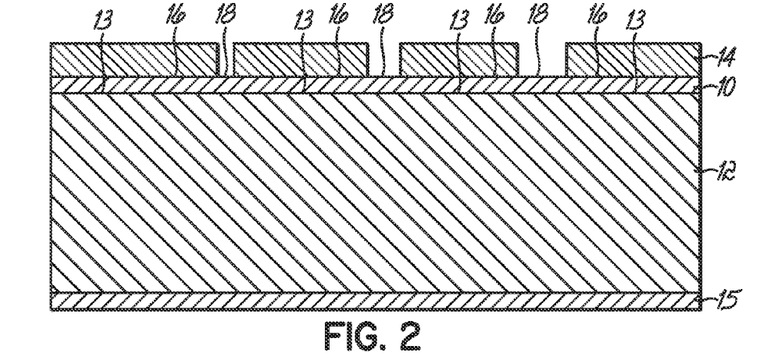

With reference to FIG. 2 in which like reference numerals refer to like features in FIG. 1 and at a subsequent fabrication stage, a conventional lithographic operation is performed in which a resist layer 14 is applied to the hard mask 10, exposed to impart a latent image pattern characteristic of the intended locations of trenches 22, 24 and 26 (FIG. 4), and developed to transform the latent image pattern into a final image pattern that defines masked areas 16 and unmasked areas 18 overlying hard mask 10. The unmasked areas 18 overlie the intended locations of the trenches 22, 24 and 26 in which hard mask 10 is removed and have line widths corresponding to the feature size of the corresponding one of the trenches 22, 24 and 26.

In one specific embodiment of the invention, the hard mask 10 is spin-coated with a primer, such as hexamethyldisilizane (HMDS), that promotes adhesion of the resist layer 14 with the hard mask 10. A film of a suitable positive photoresist, such as Shipley SPR 950 chemically amplified photoresist, is spin-coated on hard mask 10 and then soft-baked, for example at 90° C. for about one (1) minute, to dry the photoresist film and improve photoresist adhesion to the hard mask 10. The photoresist film is light exposed on a stepper to impart the latent image pattern characteristic of trenches and post exposure baked, for example at about 100° C. for about two (2) minutes, to aid in the exposure-induced photoreaction. The stabilized photoresist is developed by spraying or immersion wetting with a conventional optical developer solution for a duration effective to create the final image pattern. An exemplary developing process consists of a ninety (90) second wetting with Shipley MF701 optical photoresist developer solution. The photoresist is then hard baked, for example at about 120° C., to stabilize the photoresist before subsequent processing (i.e., reactive ion etching). For (100) silicon substrates 12, a plane containing the minor axis of each unmasked areas 18 is aligned with approximately parallel to one of four orthogonal (110) planes characteristic of a (100)-oriented substrate.

Figure 3:
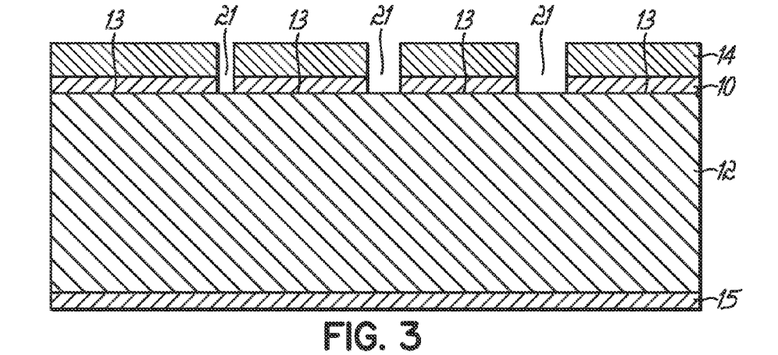

With reference to FIG. 3 in which like reference numerals refer to like features in FIG. 2 and at a subsequent fabrication stage, portions of hard mask 10 are removed in the unmasked areas 18 defined in the patterned resist layer 14 by any suitable etch process. The removed portions define unobstructed trench-shaped vias 21 that expose the underlying substrate 12. The patterned resist layer 14 is subsequently stripped after these portions of hard mask 10 are removed. In one embodiment of the invention in which the substrate 12 is silicon and the hard mask 10 is oxide, the etch process is carried out in a Materials Research Corporation parallel plate RIE chamber at an operating frequency of 13.56 megahertz (MHz) and with an etch recipe characterized by a gas mixture of $CHF_3/O_2$ in a 20 sccm to 1 sccm flow rate ratio, an etch chamber pressure of 10 mTorr, an etch power of about 150 watts, and a process time of about 10 minutes. However, it is contemplated that other apparatus known in the industry may be used to carry out the dry etch and that other etch recipes may be utilized. The $CHF_3$-based etch chemistry selectively etches oxide over silicon and resist. Another suitable gas mixture having this selectivity to oxide is a $CF_4/H_2$ mixture.

Figure 4:
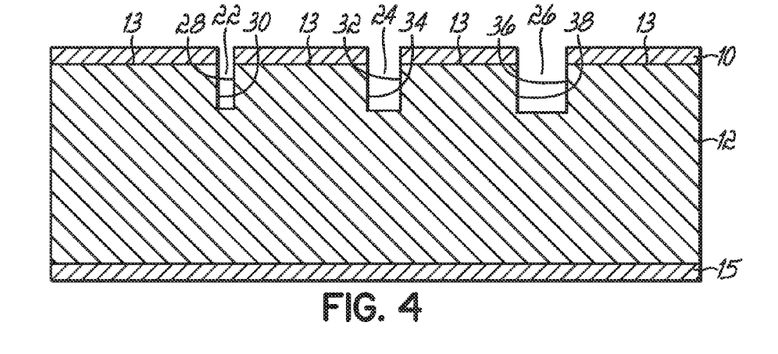

With reference to FIG. 4 in which like reference numerals refer to like features in FIG. 3 and at a subsequent fabrication stage, deep cavities or trenches 22, 24, 26 are formed in substrate 12 in the regions defined by vias 21 using any suitable conventional anisotropic etch process, such as deep reactive ion etching (e.g., DRIE), capable of producing substantially vertical trench sidewalls. Masked areas 16 of substrate 12 protected by hard mask 10 are not etched by the anisotropic etch process. Trench 22 is characterized by opposed vertical sidewalls 28, 30 separated by a relatively narrow trench width, trench 24 is characterized by opposed vertical sidewalls 32, 34 separated by a slightly wider spacing than sidewalls 28, 30, and trench 26 is characterized by opposed vertical sidewalls 36, 38 separated by a relatively wide trench width. The various widths of the trenches 22, 24, 26 make the completed characterizer 56 (FIG. 7) suitable for calibrating probe tips of differing dimensions.

A Bosch etch process, as described in U.S. Pat. No. 5,501,893, represents one suitable DRIE process for forming deep trenches, such as trenches 22, 24, 26, characterized by a very high etching rate for silicon, vertical sidewalls, a high aspect ratio, and a high selectivity to oxide. According to the Bosch etch process, the anisotropic etching process entails several cycles consisting of alternating sequential vertical etching and passivation steps. During the vertical etching step, the principal etchant is frequently $SF_6$, which may be mixed with a diluent so that the $SF_6$ concentration in the plasma source gas is typically at least about seventy-five (75) percent by volume. During the passivation step, a plasma generated from a source gas, such as $C_4F_8$, coats the trench sidewalls with a passivation layer. The passivation layer helps prevent lateral etching of the trench sidewalls during the vertical etching step of a subsequent cycle.

In one specific embodiment of the invention in which substrate 12 is silicon and the hard mask 10 is oxide, the anisotropic etch process is a Bosch etch process conducted in a Unaxis SLR770 inductively coupled plasma (ICP) reactor manufactured by Unaxis USA Inc. (St. Petersburg, Fla.). However, it is contemplated that other etch systems known in the industry may be used to perform the Bosch etch process. The Bosch etch process conditions include a plasma source power of about 525 watts, an etch (substrate bias) power of about ten (10) watts, a process chamber pressure of about twenty (20) mTorr, and a substrate temperature of about 40° C. The trenches 22, 24, 26 are deep etched in this exemplary embodiment by alternating seven (7) second vertical etch steps using $SF_6$ as a source gas and seven (7) second passivation steps using $C_4F_8$ as a source gas. The substrate 12 is etched for a total of about three (3) minutes, which produces trenches 22, 24, 26 with a depth of approximately six (6) μm. Trenches 22, 24, 26 have nominal widths of about one (1) μm, about two (2) μm and about three (3) μm, respectively. The etched trench depth increases slightly with increasing trench width.

Subsequent to the anisotropic etch process that forms trenches 22, 24, 26, the substrate 12 is exposed to a piranha cleaning step that typically includes dipping in an inorganic oxidant, such as a piranha solution containing sulfuric acid and hydrogen peroxide. This piranha cleaning step removes organic material from the surface of the substrate 12. Typical piranha cleaning solutions comprise hydrogen peroxide ($H_2O_2$) and sulfuric acid ($H_2SO_4$) mixed in a ratio of about 1:5 to about 1:50 ($H_2O_2$:$H_2SO_4$). Any low-quality oxide film formed during the piranha clean is removed by immersion in a diluted aqueous solution of hydrofluoric acid (HF) and deionized (DI) water. In one specific embodiment of the invention in which substrate 12 is silicon and the hard mask 10 is oxide, the substrate was cleaned for approximately 15 minutes in a piranha bath (1:5 30 percent by volume $H_2O_2$ in water:95 percent by volume $H_2SO_4$ in water), rinsed in DI water, and then immersed in an aqueous solution of two (2) percent HF and DI water for approximately thirty (30) seconds to remove the oxide film added by the piranha clean.

For reasons of simplicity and clarity, subsequent fabrication stages will be described in the context of trench 26. However, it is understood that the following description of the fabrication of trench 26 pertains equally to the fabrication of trenches 22 and 24, which are exposed to the described fabrication stages concurrently with trench 26 and are scalable dimensionally from trench 26.

Figure 5:
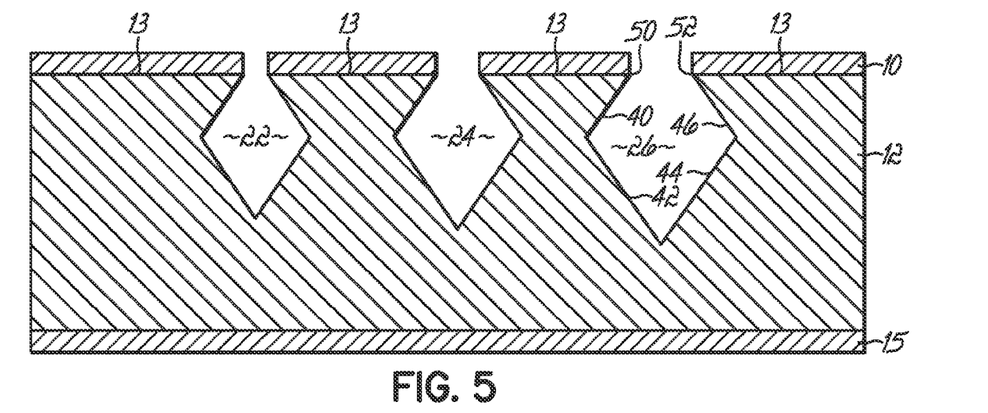

With reference to FIG. 5 in which like reference numerals refer to like features in FIG. 4 and at a subsequent fabrication stage, the trench sidewalls 36 and 38 (FIG. 4) of trench 26 are contoured with inclined or faceted surfaces 40, 42, 44, and 46 by a wet anisotropic etch, which is followed by a rinse in deionized water. The anisotropic etchant provides different etch rates for the various crystal plane orientations of the substrate 12, which is to say that etching does not proceed in all directions at the same etch rate. Each of the faceted surfaces 40, 42, 44, and 46 is inclined relative to the vertical by a taper angle, θ, that is typically equivalent for each surface. The specific shapes, taper angles, and sizes of the faceted surfaces 40, 42, 44, and 46 will depend upon the crystallographic orientation of the constituent material of substrate 12 and upon the specific etch recipe and conditions, among other factors. Masked areas 16 of substrate 12 protected by hard mask 10 are not etched by the anisotropic etchant. As a result of the wet anisotropic etch, opposed edges 50, 52 defined at the entrance to the trench 26 overhang the underlying cavity defined by the contoured trench 26. Edge 50 is defined at the intersection of the faceted surface 40 with surface 13 and, similarly, edge 50 is defined at the intersection of the faceted surface 46 with surface 13.

Suitable aqueous anisotropic etchants of silicon include, but are not limited to, potassium hydroxide (KOH), ethylenediamine/pyrocatechol/pyrazine (EDP), tetramethyl ammonium hydroxide (TMAH), and hydrazine ($N_2H_4$). In one specific embodiment of the invention in which substrate 12 is (100) silicon and the hard mask 10 is oxide, the substrate 12 is anisotropically etched at 75° C. for five (5) minutes using an etchant solution of twenty-five (25) weight percent KOH in DI water. However, the invention is not so limited in that the KOH concentration of the etchant solution, the immersion time, and the solution temperature may differ. The KOH etch chemistry is desirable because it is selective such that it etches the bulk silicon of the substrate, but does not substantially etch the patterned oxide hard mask 10. The etch rate for (100) silicon substrates 12 perpendicular to the {100} family of planes is greater than the etch rate perpendicular to the {111} family of planes. As a result, the faceting introduced into the trench sidewalls 36, 38 is fixed by the crystalline lattice structure of the substrate 12 that, in the case of single-crystal (100) silicon, produces a taper angle of 54.7° because the etch occurs along the [100] crystal planes.

Figure 6:
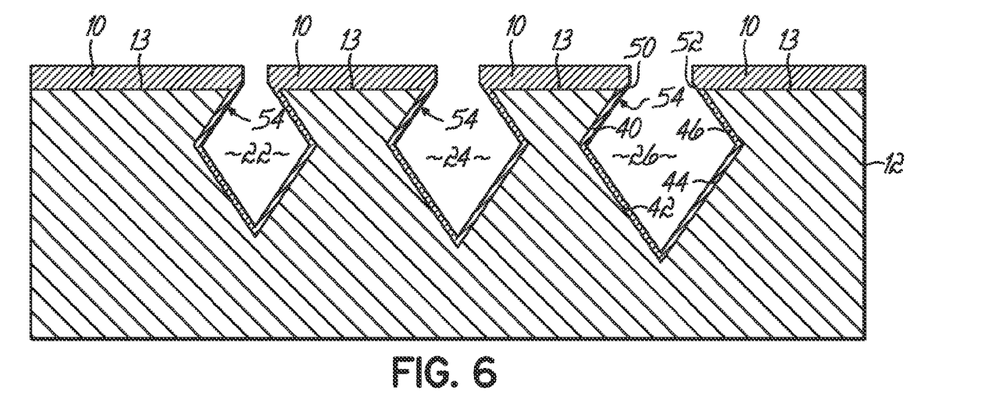

With reference to FIG. 6 in which like reference numerals refer to like features in FIG. 5 and at a subsequent fabrication stage, a thin sacrificial layer 54 is grown on the faceted surfaces 40, 42, 44, and 46 of the trench 26. The process forming sacrificial layer 54 also increases the thickness of hard mask 10 on the upper surface 13. However, the thickness of substrate 12 consumed on the upper surface 13 is less than the thickness of substrate 12 consumed on faceted surfaces 40, 42, 44, and 46. The process that forms sacrificial layer 54 and thickens hard mask 10 also consumes less constituent material of substrate 12 proximate to each of the edges 50, 52 than at other locations on upper surface 13 or in trench 26.

In one specific embodiment of the invention in which substrate 12 is (100) silicon and the hard mask 10 is oxide, the process forming sacrificial layer 54 and thickening hard mask 10 is a low temperature oxidation that exposes the substrate 12 to a dry or wet oxygen-laden ambient in, for example, an oxidation furnace held at a suitable oxidation temperature (e.g., 950° C. for 60 minutes). Conventional silicon oxidation kinetics cause the differences in the consumed substrate thickness between upper surface 13 and faceted surfaces 40, 42, 44 and 46. In particular, the oxidizing species from the ambient must diffuse through the existing hard mask 10 to react with the constituent material of substrate 12 and form additional thicknesses of oxide. Hence, diffusion through the thickness of hard mask 10 causes the ultimate increase in the thickness of hard mask 10 to be less than the final thickness of sacrificial layer 54, which is grown on initially-bare substrate material inside trenches 26. In addition, the flow of the viscous oxide during low-temperature oxidation causes edges 50, 52 to oxidize at a lower oxidation rate than upper surface 13 and, hence, reduces the oxide thickness increase of hard mask 10 proximate to edges 50, 52. As a result, the edges 50, 52 are oxidation sharpened after the hard mask 10 is thickened and stripped.

Figure 7:
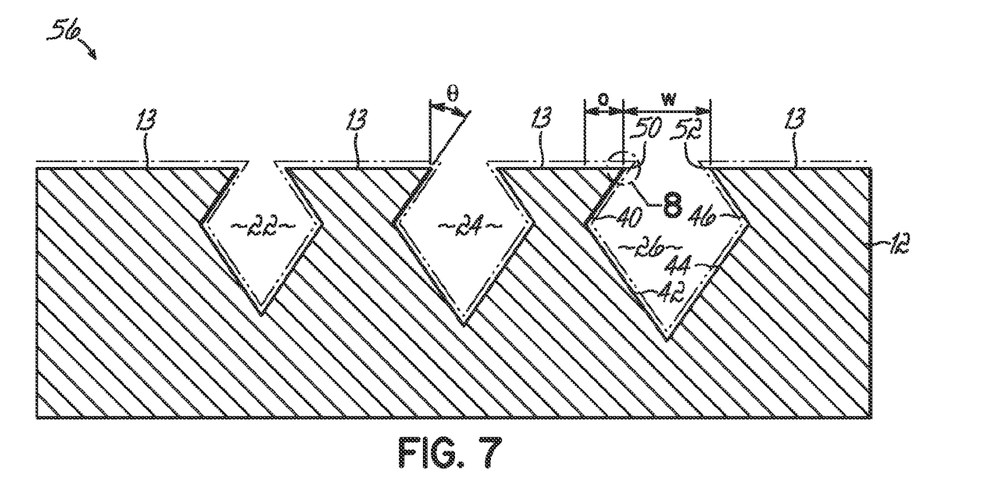
Figure 8:
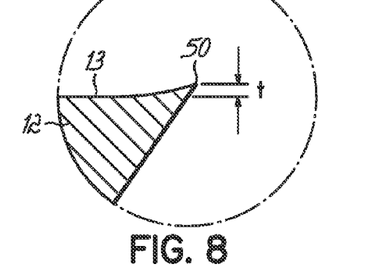
FIG. 8 is an enlargement of a portion of the probe tip characterizer of FIG. 7.

With reference to FIGS. 7 and 8 in which like reference numerals refer to like features in FIG. 6 and at subsequent fabrication stage, the hard mask 10 and the sacrificial layer 54 are stripped to reveal the underlying substrate 12. In one specific embodiment of the invention in which the hard mask 10 is oxide, the hard mask 10 is removed by immersion in a buffered hydrofluoric acid solution for a suitable duration, such as about five (5) minutes, that depends among other variables upon the oxide thickness and solution strength. Upper surface 13 curves upwardly proximate to edges 50, 52 because the thickness of the hard mask 10 stripped from the upper surface 13 decreases as edges 50, 55 are approached, as explained above. As a result, the edges 50, 52 are elevated above the surface 13 in a direction away from the trench 26, as best shown in FIG. 8, after the hard mask 10 and the sacrificial layer 54 are removed. Typically, each edge 50, 52 is elevated upwardly or vertically by a distance, t, relative to a horizontal plane containing surface 12. In certain embodiments of the invention, the elevation distance of edges 50, 52 ranges from about 5 nanometers to about 20 nanometers. The upward elevation of the edges 50, 52 is useful for measuring the shape profile of a bottom surface of a probe tip 60 (FIG. 9), as explained below.

With reference to FIG. 7, the trenches 22, 24, 26 of a finished characterizer 56 share other properties that improve the ability to measure tip shape as compared with conventional characterizers. After processing is concluded, edges 50, 52 are separated by a width, W, suitable for characterizing a dimension of the probe tip. At least one of the edges 50, 52 overhangs an undercut defined by a portion of the contoured trench 26 by an overhang distance, O, measured, for example, for edge 52 between a vertical line tangent to edge 50 and a vertical line tangent to the junction of faceted surfaces 42 and 46. In certain embodiments of the invention, the overhang distance is greater than one third of the width and, in other embodiments, the overhang distance is greater than one half of the width. It is appreciated by a person of ordinary skill in the art that the widths of the trenches 22, 24, 26 intentionally vary to provide a characterizer 56 capable of measuring the shape of probe tips of differing dimensions. The invention contemplates that characterizer 56 may incorporate any number of trenches of different and/or similar widths and different and/or similar overhang distances.

Figure 9:
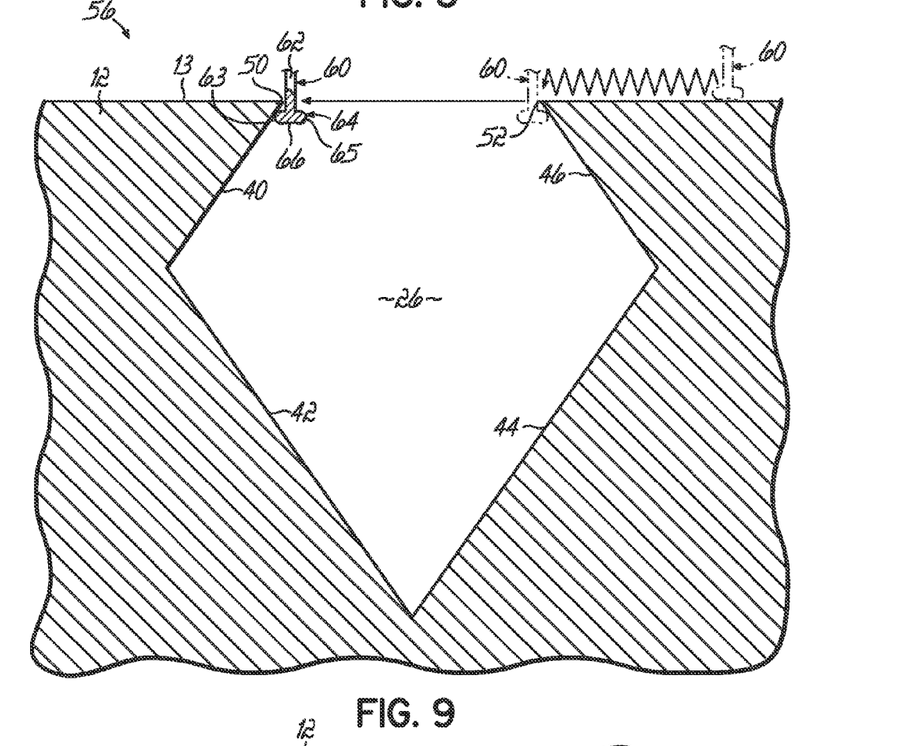
FIG. 9 is a diagrammatic view illustrating the use of the probe tip characterizer for characterizing a probe tip of an atomic force microscope.

In use and with reference to FIG. 9, an AFM probe tip 60 for measuring pattern dimensions includes a narrow neck 62 of a post projecting from a cantilever (not shown) and a thin, outwardly-projecting boot 64 that encircles the circumference of the free end of the neck 62. The width of the boot 64 is measured relative to the diameter of the neck 62. The probe tip 60 is mounted in an AFM (not shown), which is operated as understood by persons of ordinary skill in the art to perform a calibration procedure. An end or bottom surface 66 of the boot 64 may be flat or may be cusped (i.e., either concave or convex). The probe tip 60 is positioned with the bottom surface 66 generally opposed to the planar surface 13 of the characterizer 56 of the invention and moved along the surface 13 toward one of the trenches 22, 24, 26. The probe tip 60 is translated over one of the first and second edges 50, 52 to profile one side or side surface 63 of the boot 64 as understood by persons of ordinary skill in the art. The probe tip 60 is then translated over the other of the first and second edges 50, 52 to profile the opposite side or side surface 65 of the probe tip 60 also as understood by persons of ordinary skill in the art. The upward elevation of the edges 50, 52 may be used to determine a shape profile of the bottom surface 66, which may be used, for example, to sense a concavity in the bottom surface 66. The profile of the probe tip 60 is used to develop a correction factor used to correct AFM image data by techniques understood by persons of ordinary skill in the art. The correction effectively deconvolves the effects of the probe tip 60 from the measurement so that the AFM image more accurately reflects the sample surface.

Figure 10:
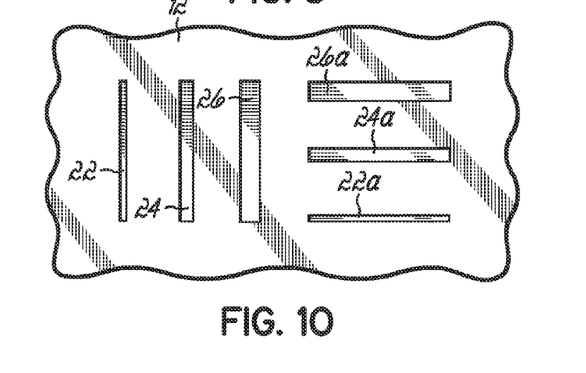
FIG. 10 is a diagrammatic top view illustrating an alternative embodiment of a probe tip characterizer.

With reference to FIG. 10 in which like reference numerals refer to like features in FIGS. 1–9, the characterizer 56 may include trenches 22, 24, 26 and another set of trenches 22a, 24a, 26a each having a major axis that is aligned at an angle relative to a major axis of each of trenches 22, 24, 26, which is particularly useful for profiling two different portions of the probe tip 60 without reorienting the characterizer 56 in the AFM (not shown). Typically, a major axis characterizing trenches 22a, 24a, 26a is aligned orthogonal to a major axis characterizing trenches 22, 24, 26. The presence of two distinct sets of non-aligned trenches on substrate 12 permits characterization of all dimensions of the probe tip 60 without re-orienting the characterizer 56. For (100) silicon substrates, the {100} planes are oriented with a 90° angular spacing. As a result, the wet anisotropic etching that contours trenches 22, 24, 26 will simultaneously contour the trench sidewalls of trenches 22*a*, 24*a*, 26*a*.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method of characterizing a probe tip of an atomic force microscope, comprising:
   providing a characterizer comprising a micromachined crystalline structure including a surface with first and second edges separated by a width suitable for characterizing a dimension of the probe tip, at least one of the first and second edges overhanging an undercut region and elevated above the surface in a direction away from the undercut region;
   positioning the probe tip in the atomic force microscope with an end generally opposed to the surface; and
   moving the probe tip along the surface and over one of the first and second edges to profile a portion of the probe tip.

2. The method of claim 1 wherein providing the characterizer further comprises:
   forming the elevated edges by oxidation sharpening.

3. The method of claim 1 further comprising:
   generating a correction factor from the profiled probe tip portion for use in correcting distorted image data acquired by the atomic force microscope.

4. The method of claim 1 wherein the probe tip has a side surface intersecting the end, and moving the probe tip along the surface further comprises:
   moving the probe tip relative to at least one of the first and second edges to profile a shape of the end.

5. The method of claim 1 wherein the probe tip has a side intersecting the end, and moving the probe tip along the surface further comprises:
   moving the probe tip relative to at least one of the first and second edges to profile a shape of the side.

6. The method of claim 1 wherein the first edge is elevated above the surface in a direction away from a first undercut region and wherein the second edge is elevated above the surface in a direction away from a second undercut region, and further comprising:
   moving the probe tip along the surface and over the first edge to profile a first portion of the probe tip; and
   moving the probe tip along the surface and over the second edge to profile a second portion of the probe tip.

7. The method of claim 1 wherein the at least one of the first and second edges overhangs the undercut region by an overhang distance greater than one third of the width separating the first and second edges.

8. A method of characterizing a probe tip for an atomic force microscope, the probe tip having a side and an end, the method comprising:
   mounting the probe tip to the atomic force microscope;
   positioning the probe tip with the end generally opposed to a surface of a characterizer;
   moving the probe tip along the surface of the characterizer toward an edge overlying an undercut region below the surface; and
   moving the probe tip across an edge bordering the undercut region and elevated above the surface in a direction away from the undercut region to profile a shape of at least one of the side of the probe tip or the end of the probe tip.

9. The method of claim 8 wherein moving the probe tip toward the edge further comprises:
   moving the probe tip across the edge to profile the shape of the side of the probe tip.

10. The method of claim 8 wherein moving the probe tip toward the edge further comprises:
    moving the probe tip across the edge to profile the shape of the end of the probe tip.

* * * * *

UNITED STATES PATENT AND TRADEMARK OFFICE
CERTIFICATE OF CORRECTION

PATENT NO. : 7,210,330 B2 Page 1 of 1
APPLICATION NO. : 11/466908
DATED : May 1, 2007
INVENTOR(S) : Chand et al.

It is certified that error appears in the above-identified patent and that said Letters Patent is hereby corrected as shown below:

Title page, item [73], column 1, line 10, after "Instruments" delete ",".
Column 4, line 65, after "aligned" delete "with".
Column 7, line 53, after "at" insert --a--.

Signed and Sealed this

Thirtieth Day of October, 2007

JON W. DUDAS
*Director of the United States Patent and Trademark Office*